…

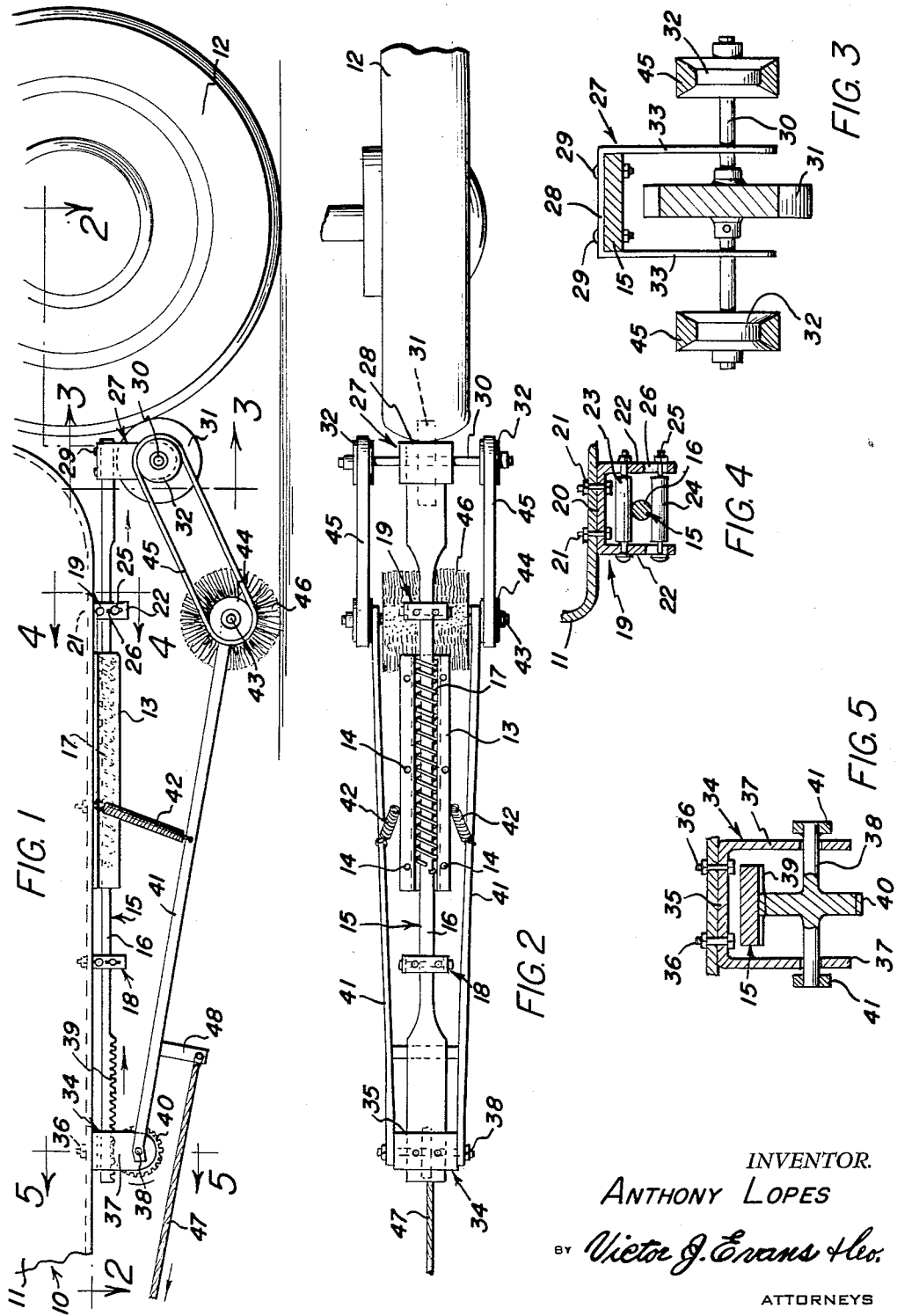

2,994,896
SNOW CLEARING DEVICE
Anthony Lopes, 377 Broad St., Cumberland, R.I.
Filed July 11, 1958, Ser. No. 747,940
4 Claims. (Cl. 15—82)

This invention relates to a vehicle, and more particularly to a snow clearing attachment for a vehicle.

The object of the invention is to provide a snow clearing device which is adapted to be connected to a vehicle such as an automobile, so that by properly actuating the device, a brush or cleaning member can be moved into engagement with the snow so that the snow can be swept or brushed away whereby the vehicle will be able to travel over roads or surfaces which are covered with snow.

A further object of the invention is to provide a snow clearing device which occupies a raised out-of-the-way position when it is not needed or when it is not being used, and wherein when the device is to be used for clearing snow from in front of the rear traction wheels of a vehicle, the device can be readily actuated by means of a cable or the like which can be conveniently positioned or arranged so that it can be actuated from a person seated in the vehicle, so that a snow cleaning brush or member can be moved to operative position in order to clear a path in front of the rear traction wheels of the vehicle so that the vehicle will not skid or slip or slide on snow, ice or the like.

A further object of the invention is to provide a snow clearing device which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a fragmentary elevational view illustrating the snow clearing device of the present invention, and showing the brush in lowered position.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 1.

FIGURE 5 is a sectional view taken on the line 5—5 of FIGURE 1.

Referring in detail to the drawings, the numeral 10 indicates a portion of a vehicle such as an automobile which includes a body portion 11, and there is further provided the usual rear wheels 12, FIGURES 1 and 2. The present invention is directed to a snow clearing attachment which includes a U-shaped support member 13 that is secured to the lower section of the body portion 11 in any suitable manner, as for example by means of securing elements 14.

The numeral 15 indicates a movable bar which includes an intermediate cylindrical portion 16 that extends through the support member 13, and a coil spring 17 is arranged in engagement with the intermediate cylindrical portion 16.

There is further provided a pair of spaced apart bearing assemblies 18 and 19, and these bearing assemblies may have similar constructions and as shown in FIGURE 4 a bearing assembly such as the bearing assembly 19 includes a top piece 20 which is secured to the body portion 11 in any suitable manner, as for example by means of securing elements 21. The bearing assembly 19 further includes spaced parallel vertically disposed side pieces 22, and there is provided horizontally disposed roller bearings 23 and 24 which have trunnions 25 extending therefrom and the trunnions on the bearing 24 may extend through slots 26 in the side pieces 22. This arrangement provides that the bearing assemblies will conform to or snugly engage the movable bar 15.

There is further provided a U-shaped bracket 27 which is arranged contiguous to the rear end of the movable bar 15, and the bracket 27 includes a horizontally disposed upper web 28 which is secured to the rear end of the bar 15 as for example by means of securing elements 29. The bracket 27 further includes a pair of vertically disposed spaced parallel side sections 33. The numeral 30 indicates a drive shaft which extends through the side sections 33, and a roller 31 is mounted on the drive shaft 30. The roller 31 is mounted for movement into and out of frictional engagement with the rear wheel 12 as later described in this application. Also mounted on the drive shaft 30 is a pair of spaced parallel pulley wheels 32.

Arranged contiguous to the front end of the body portion 11 is a U-shaped base piece which is indicated generally by the numeral 34. The base piece 34 includes a horizontally disposed top wall 35 which is adapted to be secured to the bottom of the portion 11 in any suitable manner, as for example by means of securing elements 36. The base piece 34 further includes a pair of spaced parallel side walls 37, and a rod 38 extends through the side walls 37. The numeral 39 indicates rack teeth which are arranged on the lower front portion of the bar 15, and a pinion gear 40 is mounted on the rod 38 and meshes with the rack teeth 39.

The numeral 41 designates each of a pair of movable arms, and the front ends of the arms 41 are secured to the rod 38. Spring members 42 are connected to the arms 41, as for example as shown in FIGURES 1 and 2, and these spring members 42 serve to normally urge the arms 41 to a raised position towards the body portion 11. Carried by the rear ends of the arms 41 is a driven shaft 43, and a pair of spaced parallel pulley members 44 are mounted on the driven shaft 43. A cylindrical brush 46 is mounted on the driven shaft 43, as shown in the drawings. The numeral 45 indicates each of a pair of endless flexible belts which are trained over the pulley members 44 and the pulley wheels 32.

A means is provided for lowering the arms 41 and brush 46, so that the brush 46 can be positioned in engagement with the snow, and this means comprises a cable 47 which has one end connected to a lug 48 that depends from one of the arms 41. The cable 47 may lead to a convenient position such as to the position adjacent to the vehicle dashboard whereby the cable 47 can be readily manually actuated by a person sitting in the vehicle.

From the foregoing, it is apparent that there has been provided a device which is especially suitable for sweeping or clearing snow from the path of vehicle wheels so that the vehicle will be able to readily travel over such areas that have been covered with snow, ice or the like. Normally when the device is not being used, the arms 41 are in a raised position contiguous to the lower surface of the body portion 11, and the arms 41 are held in this raised position by means of the spring members 42. However, when there is snow or ice on the ground or road, it is only necessary for the driver or other person in the vehicle to pull on the cable 47 and this will cause the pair of arms 41 to pivot downwardly in a clockwise direction, FIGURE 1, and as the arms 41 are moved downwardly by means of the cable 47, the rod 38 will be rotated, since the front ends of the arms 41 are secured to the rod 38. As the rod 38 moves, it causes the pinion gear 40 to rotate, and since the pinion gear 40 meshes with the rack teeth 39, it will be seen that this movement will cause the bar 15 to move from left to right, FIGURES 1 and 2. This movement of the bar 15 will compress the coil spring 17 and as the bar 15 moves rearwardly, the bracket 27 will be moved rearwardly since the bracket 27 is secured to the bar 15 as at 29. The bracket 27 carries the drive shaft 30, so that as the bar 15 moves, the roller 31 on the shaft 30 will be moved into frictional engagement with the outer periphery of the wheel 12. At the same time, the arms 41 will have been pulled downwardly so as to cause the rotary brush 46 to engage the snowy surface to be cleaned. It is to be noted that the brush 46 is arranged directly in front of the wheel 12 so that a path in front of the wheel 12 will be readily cleaned or brushed free of sufficient snow so that the wheel can develop enough traction or friction to propel the vehicle in the usual manner. With the parts in the position shown in FIGURES 1 and 2, it will be seen that as the wheel 12 is driven by the usual engine of the vehicle, the roller 31 will rotate since the roller 31 frictionally engages the wheel 12. As the roller 31 turns, it will rotate the shaft 30, and since the shaft 30 carries the pair of pulleys 32, it will be seen that the pulleys 32 will be rotated. The pulleys 32 have the endless flexible belts 45 trained thereover, and these belts 45 are also trained over the pulleys 44 on the shaft 43. Thus, the shaft 43 will be driven and since the brush 46 is connected to the shaft 43, it will be seen that the brush 46 will be rotated so that the snow will be swept away from the area in front of the wheel 12.

When pressure is released on the cable 47, the springs 42 will return the arms 41 and their associated parts to raised position so that the brush 46 will be out of contact with the ground or road surface. Similarly, the spring 17 will move the bar 15 from right to left, FIGURES 1 and 2, so that the roller 31 will move out of engagement with the wheel 12.

The base piece 34 is secured to the body portion 11 by means of the securing elements 36, and the front portion of the bar 15 is capable of sliding movement through the base piece 34. The U-shaped bracket 27 is secured to the rear end of the bar 15 as at 29, so that as the bar 15 moves, the base piece 34 remains stationary, but the bracket 27 moves with the bar.

The roller bearing assemblies 18 and 19 are of the adjustable type. The brush 46 may be in the nature of a wire brush and may have the same size as the tire on the wheel 12. The present invention is adapted to eliminate the necessity of using tire chains when driving in winter snow, and one of the devices is adapted to be mounted on each side of the vehicle adjacent the under portion of the body. The cable 47 can be connected to a lever or foot pedal adjacent to the dashboard of the vehicle so that when the cable 47 is pulled on, the wire brush 46 will move towards the ground. With the vehicle in operation, the wheel 12 will rotate so as to cause movement of the belts 45 which may be made of a flexible material such as rubber so that the brush 46 will function as previously described.

Minor changes in shape, size and rearrangement of details coming within the field of invention claimed may be resorted to in actual practice, if desired.

I claim:

1. In a snow clearing device adapted for attachment to a vehicle including a body portion and at least one rear wheel, a U-shaped support member, a movable bar having an intermediate cylindrical portion slidably mounted for reciprocating movement in said support member, a coil spring mounted on the intermediate cylindrical portion of said bar within said support member, said spring extending longitudinally of said support member with one end thereof connected to said bar and the other end thereof connected to said support member, the tension of said spring retaining the cylindrical portion of said bar within said support member, a rack and pinion mechanism associated with said bar for effecting the movement of said bar, bearing assemblies positioned at opposite ends of said support member and engaging the intermediate cylindrical portion of said bar fore and aft of said support member, a U-shaped bracket including a web secured to the rear end of said bar, said bracket including a pair of spaced parallel vertically disposed side sections, a drive shaft supported by said side sections, a roller mounted on said shaft and said roller being mounted for movement with said bar so that as said bar moves said roller will be moved into and out of fractional engagement with said rear wheel, a pair of spaced parallel pulley wheels mounted on said shaft, a U-shaped base piece positioned forwardly of the bearing assembly positioned forwardly of said support member, said base piece including a top wall and a pair of spaced parallel side walls, a rod extending through the side walls of said base piece, said rack and pinion mechanism including rack teeth on the front portion of said bar, a pinion gear on said rod meshing with said rack teeth, a pair of spaced apart arms extended in longitudinal alinement with said bar and having their front ends rigidly connected to said rod, remote control means connected to said arms to cause the movement of said arms and the subsequent movement of said rod and bar, spring members for returning said arms to normal position after movement thereof by said remote control means connected to said arms, a driven shaft carried by the rear ends of said arms, pulley members mounted on said driven shaft, flexible endless belts trained over said pulley wheels and pulley members, and a cylindrical brush mounted on said driven shaft.

2. The structure as defined in claim 1, wherein said remote control means includes a cable connected to said arms whereby upon movement of said cable said arms will be moved downwardly to urge said cylindrical brush into operative engagement with the ground surface forwardly of said rear wheel.

3. In a snow clearing device adapted for attachment to a vehicle, a U-shaped support member, a movable bar having an intermediate cylindrical portion slidably mounted in said support member, a coil spring mounted on the intermediate cylindrical portion of said bar within said support member and connected to said bar and support member so that the tension of said spring will retain the cylindrical portion of said bar within said support member, bearing assemblies engaging the intermediate cylindrical portions of said bar fore and aft of said support member, a U-shaped bracket including a web secured to the rear end of said bar, said bracket including a pair of spaced parallel vertically disposed side sections, a drive shaft supported by said side sections, a roller mounted on said shaft, a pair of spaced parallel pulley wheels mounted on said shaft, a U-shaped base piece having a top wall, said base piece being positioned forwardly of the bearing assembly forwardly of said support member and including a pair of spaced parallel side walls, a rod extending through said side walls, rack and pinion means for causing movement of said rod, and said rack and pinion means comprising rack teeth on the front portion of said bar, a pinion gear on said rod meshing with said rack teeth, a pair of spaced apart arms extending in longitudinal alinement with said bar and having their front ends rigidly connected to said rod, remote control means connected to said arms to cause the movement of said arms and subsequent movement of said rod and bar, spring members connected to said arms for urging said arms toward said support member, a driven shaft carried by the rear ends of said arms, pulley members mounted on said driven shaft, flexible endless belts trained over said pulley wheels and pulley members, a cylindrical brush mounted on said driven shaft, and said remote control means comprising a cable for moving said arms to urge said brush into operative engagement with the ground surface.

4. In a snow clearing device adapted for attachment to a vehicle, a support member, a movable bar having an intermediate cylindrical portion slidably mounted in said support member, bearing assemblies engaging the intermediate cylindrical portion of said bar fore and aft of said support member, a U-shaped bracket including a web secured to the rear end of said bar, said bracket including a pair of spaced parallel vertically disposed side sections, a drive shaft supported by said side sections, a roller mounted on said shaft, a pair of spaced parallel pulley wheels mounted on said shaft, a U-shaped base piece having a top wall, said base piece being positioned forwardly of the bearing assembly forwardly of said support member and including a pair of spaced parallel side walls, a rod extending through said side walls, mounting means connected to said rod, a driven shaft carried by one end of said mounting means, pulley members mounted on said driven shaft, flexible endless belts trained over said pulley wheels and pulley members, a cylindrical brush mounted on said driven shaft, rack and pinion means connecting the opposite end of said mounting means to said bar, and a cable connected to said mounting means for moving said means to move said bar to move said roller into engagement with the power wheel of an automobile.

References Cited in the file of this patent
UNITED STATES PATENTS

| | | |
|---|---|---|
| 124,321 | Blakely | Mar. 5, 1872 |
| 427,834 | Campbell | May 13, 1890 |
| 1,387,626 | Swanson | Aug. 16, 1921 |
| 2,505,311 | Vinnick | Apr. 25, 1950 |